UNITED STATES PATENT OFFICE.

JAMES HORLICK AND WILLIAM HORLICK, OF CHICAGO, ILLINOIS.

IMPROVEMENT IN CONCENTRATED EXTRACTS FOR FOOD.

Specification forming part of Letters Patent No. 163,493, dated May 18, 1875; application filed October 12, 1874.

*To all whom it may concern:*

Be it known that we, JAMES HORLICK and WILLIAM HORLICK, of Nos. 82 and 84 North La Salle street, of Chicago, in the county of Cook and in the State of Illinois, have invented certain new and useful Improvements in a Concentrated Extract as a Food for Infants, Dyspeptics, and Invalids; and do hereby declare that the following is a full, clear, and exact description thereof.

The nature of our invention consists in a concentrated extract to be used as food for infants, dyspeptics, and invalids, as will be hereinafter more fully set forth.

Our extract is made as follows: We first mix equal parts of wheat flour and malt flour. We then take wheat bran in the proportion of one pound to twelve pounds of the mixed flours, and bi-carbonate of potash in the proportion of one ounce to four pounds of the mixed flours. These are all thoroughly mixed together and placed in a vessel with sufficient water to form a thin paste. The mixture is then heated to a certain temperature and strained through a sieve, the marc pressed and the liquids evaporated in a water-bath to a dry extract, which is powdered and put into bottles for use. We do not confine ourselves to the exact proportion herein stated.

By this process the flour is so thoroughly transformed into dextrine and grape-sugar by the malt (when heated to a certain temperature) as to be easily assimilated by the weakest infant or invalid. The food thus prepared is perfectly free from all farinaceous matter, the flour having been transformed into dextrine and grape-sugar by the vegetable diastase of the malt, exactly as it would happen in the digestive organs of an adult.

It is well known that infants cannot digest farinaceous food until they have their teeth, as they have not the power of masticating and mixing the saliva (which contains the diastase) with it, consequently the food is not digested in the stomach, hence follow the innumerable ailments children are subject to. Our extract, on the contrary, is perfectly digested by the weakest infant, and it is proven by analysis to be the nearest approach to mother's milk. It will keep good for any time in any climate, and is easily prepared for infants in the following manner: Dissolve from a half to a whole table-spoonful, according to age, in half a pint of warm cow's milk and water, equal parts, and give it to the infant by means of an ordinary nursing-bottle. It requires no boiling.

Having thus fully described our invention, what we claim as new, and desire to secure by Letters Patent, is—

The concentrated extract for food, consisting of wheat flour, malt flour, wheat bran, and bicarbonate of potash, substantially as herein set forth.

In testimony that we claim the foregoing we have hereunto set our hands this 3d day of October, 1874.

JAMES HORLICK.
WILLIAM HORLICK.

Witnesses:
THOMAS SWEENEY,
W. G. PHILLIPS.